United States Patent
Hagenburg

(10) Patent No.: US 11,178,338 B2
(45) Date of Patent: Nov. 16, 2021

(54) IMAGING SYSTEM FOR A VEHICLE AND METHOD FOR OBTAINING AN ANTI-FLICKERING SUPER-RESOLUTION IMAGE

(71) Applicant: SMR Patents S.à.r.l., Luxembourg (LU)

(72) Inventor: Kai Uwe Hagenburg, Stuttgart (DE)

(73) Assignee: SMR Patents S.à.r.l., Luxembourg (LU)

(*) Notice: Subject to any disclaimer, the term of this patent is extended or adjusted under 35 U.S.C. 154(b) by 7 days.

(21) Appl. No.: 16/464,155

(22) PCT Filed: Nov. 15, 2017

(86) PCT No.: PCT/EP2017/079308
§ 371 (c)(1),
(2) Date: May 24, 2019

(87) PCT Pub. No.: WO2018/095779
PCT Pub. Date: May 31, 2018

(65) Prior Publication Data
US 2020/0314316 A1 Oct. 1, 2020

(30) Foreign Application Priority Data
Nov. 28, 2016 (DE) .............. 10 2016 122 934.2

(51) Int. Cl.
| | |
|---|---|
| H04N 5/235 | (2006.01) |
| H04N 13/167 | (2018.01) |
| H04N 13/144 | (2018.01) |
| B60R 1/00 | (2006.01) |
| G06T 3/40 | (2006.01) |

(52) U.S. Cl.
CPC ............ *H04N 5/2352* (2013.01); *B60R 1/00* (2013.01); *G06T 3/4076* (2013.01);
(Continued)

(58) Field of Classification Search
CPC .................................................. G06T 3/4076
(Continued)

(56) References Cited

U.S. PATENT DOCUMENTS

| | | | |
|---|---|---|---|
| 9,230,303 B2 | 1/2016 | Kanaev et al. | |
| 2004/0218834 A1* | 11/2004 | Bishop .................. | H04N 19/97 382/299 |

(Continued)

FOREIGN PATENT DOCUMENTS

WO WO 2016/067529 A1 5/2016

OTHER PUBLICATIONS

International Search Report dated Jan. 31, 2018 of International application No. PCT/EP2017/079308.
(Continued)

*Primary Examiner* — Amir Shahnami
(74) *Attorney, Agent, or Firm* — Jones Day

(57) ABSTRACT

An imaging system for a vehicle for obtaining an anti-flickering super-resolution image includes an image sensor adapted to obtain a sequence of images, and an image processor adapted to receive the sequence of images, compare image information of a most recent image of the sequence of images to a reference image to detect at least one image region of mismatch in the most recent image, remove the detected image region from image information of the most recent image to obtain adjusted image information, and add the adjusted image information of the most recent image to a super-resolution image.

16 Claims, 4 Drawing Sheets

(52) U.S. Cl.
CPC ......... *H04N 13/144* (2018.05); *H04N 13/167* (2018.05); *B60R 2300/105* (2013.01); *B60R 2300/107* (2013.01); *B60R 2300/20* (2013.01); *B60R 2300/30* (2013.01); *B60R 2300/80* (2013.01)

(58) Field of Classification Search
USPC ......................................................... 348/47
See application file for complete search history.

(56) References Cited

U.S. PATENT DOCUMENTS

| | | | | |
|---|---|---|---|---|
| 2010/0026695 | A1* | 2/2010 | Terada | H04N 21/4325 |
| | | | | 345/545 |
| 2014/0307982 | A1* | 10/2014 | Kanaev | G06T 3/4053 |
| | | | | 382/299 |
| 2015/0287187 | A1* | 10/2015 | Redtel | G06T 7/0016 |
| | | | | 382/128 |
| 2015/0332114 | A1* | 11/2015 | Springer | B60W 50/14 |
| | | | | 348/148 |
| 2016/0148062 | A1* | 5/2016 | Fursich | H04N 13/239 |
| | | | | 348/36 |
| 2017/0148148 | A1* | 5/2017 | Okuyama | G08G 1/0962 |

OTHER PUBLICATIONS

Written Opinion dated Jan. 31, 2018 of International application No. PCT/EP2017/079308.

\* cited by examiner

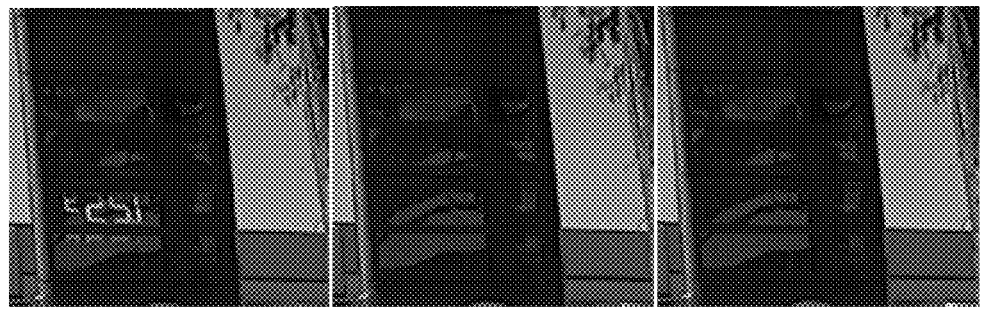
Fig 4a
Fig 4b
Fig 4c
Fig 4d
Fig 4e
Fig 4f
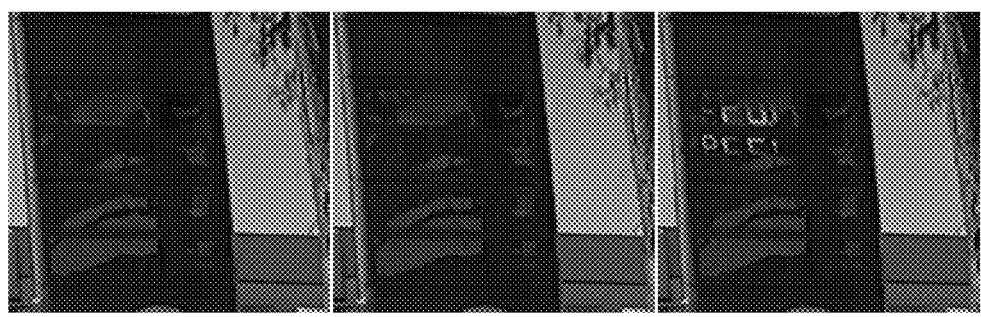
Fig 4g
Fig 4h
Fig 4i

IMAGING SYSTEM FOR A VEHICLE AND METHOD FOR OBTAINING AN ANTI-FLICKERING SUPER-RESOLUTION IMAGE

CROSS-REFERENCE TO RELATED APPLICATIONS

This application is a National Stage Entry of International Patent Application No. PCT/EP2017/079308, filed Nov. 15, 2017, which claims the benefit of foreign priority to German Patent Application No. DE 10 2016 122 934.2, filed Nov. 28, 2016, each of which is incorporated by reference herein in its entirety for all purposes.

BACKGROUND

1. Field of the Invention

The present disclosure relates to an imaging system and to a method for obtaining an anti-flickering super-resolution image, the system includes an image sensor adapted to obtain a sequence of images, an image processor adapted to for processing one or more of the obtained images.

2. Related Art

Light Emitting Diodes, LEDs, have become a quasi-standard in modern day light equipment. LED lights are used in street lamps, car headlights, traffic lights, warning signs, and/or advertisement displays. The LEDs are commonly operated on the principle of fast-pulsed emissions, i.e. the LEDs are switched on and off at a very high rate or frequency which is normally not visible for the human eye. However, modern cameras, in particular digital cameras capture images at a very high rate, which can be similar to the pulse rate of the LEDs. Unfortunately, the rate of capturing images and the pulse rate of the LEDs do not always perfectly overlap, i.e. images may be captured during the off-phase of an LED. If these images are then presented as video stream on a display device, the so-called 'flickering effect' appears, due to the mismatch of frequencies. This effect may even be intensified by effects from rolling shutter.

In particular, the 'flickering effect' can be problematic for a vehicle's Content Management System, CMS, or Advanced Driver Assistance System, ADAS, since these system rely on constant light recognition for applications such as traffic light recognition, car detection methods, the blind spot detection night mode, etc.

The most common anti-flickering approaches are concerned with LED flickering from LED light bulbs that are powered from the standard power system. When shutter-speeds are used that correspond to multiples of the power frequency, flickering effects can be almost completely avoided. Unfortunately, these schemes work only well for light sources with a fixed, synchronized power source, which is not the case for independently powered automobiles.

In the prior art, schemes for flickering detection and mitigation are described. For example, in US 2016/006919 A1 and WO 2014/164951 A1 schemes for synchronization of a recording camera with the LED frequency are described. Another approach is described in WO 2006/118686 A2 where information from an additional sensor is used for detecting flickering. A temporal filter for detecting flickering in a series of images and performing temporal filtering is described in U.S. Pat. No. 6,421,097 B1.

The approaches designed for the automotive industry usually involve down sampling the obtained images and taking the averages of fixed pixels through a set of different images from a video sequence as described in U.S. Pat. No. 6,380,985 B1. The approach described in U.S. Pat. No. 6,563,511 B1 is concerned with smart reduction of influencing pixels. Another approach is described in U.S. Pat. No. 9,232,153 B2 and relates to averaging over two subsequent images.

However, these approaches only achieve good results with objects that are kept spatially static, however, the approaches don't work well with moving objects, or when the camera is moved relative to the object.

One approach to enhance the picture quality of images captured by a device of a vehicle is described in US 2014/0193032 A1 and involves creating a super-resolution image. Even though the super-resolution image provides an improved quality of the image, flickering-effects can still mitigate the image quality.

SUMMARY

In an aspect, an imaging system for a vehicle for obtaining an anti-flickering super-resolution image includes image sensor means adapted to obtain a sequence of images, and image processing means adapted to receive the sequence of images, compare image information of the most recent one of the images of the sequence of images to a reference image to detect at least one image region of mismatch in the most recent image, remove the detected image region from the image information of the most recent image to obtain adjusted image information, and add the adjusted image information of the most recent image to a super-resolution image.

Here, the term 'anti-flickering' can be used to refer to a resulting image that is essentially free of flickering which might be due to pulsed lights. The term 'super-resolution image' can be used as referring to an enhanced image where the entire image information or part of the image information of at least two images is used to create an optically enhanced image. The 'image sensor means' can be a camera, such as for example a digital camera, or a plurality of cameras that could be arranged in an array, and which are able to obtain a 'sequence of images', which could be a continuous sequence, i.e. images could be continuously taken. The 'sequence of images' could include images obtained at different time instances, and/or from different positions depending on a spatial movement of the image sensor means relative to the imaged object.

The comparing of image information could be done by comparing the image information of an image in the sequence of images to a reference image, where the reference image could be the image recorded just before the image was recorded, or a plurality of images that were recorded just before the image was recorded. Alternatively, the reference image could be an super-imposed image that contains image information of a plurality of previously recorded images. The comparing of the information could be done, for example, by pixel-wise, or pixel-cluster-wise comparing of the brightness values of a certain pixel position(s). However, the comparing could be also done by identifying registration errors, if the images are taken from different positions.

The term 'adjusted image information' can be used to refer to image information, or pixel data, of that part of the image where no miss-match was detected.

In one example, the reference image includes at least one image of the sequence of images preceding the most recent image, preferably an image directly preceding the most recent image, and/or the super-resolution image.

In another example, the image sensor means includes at least one camera, preferably a camera of a vehicle's Advanced Driver Assistance System, ADAS, and/or Content Management System, CMS.

In yet another example, the image sensor means includes at least one camera array including a plurality of cameras, preferably including 4 to 9 cameras, and preferably the cameras are positioned apart from each other at a distance in the region of 1 cm to 2 cm, and/or a stereo camera.

In one example, each of the plurality of cameras is adapted to obtain at least one image, and wherein the plurality of cameras are adapted to obtain images at different time instances, preferably wherein each camera of the plurality of cameras is adapted to operate at a rate of 14 to 300 or 600 frames per second, preferably at a rate of 60 or 30 frames per second, and is adapted to obtain images at an interval of 16 or 33 ms.

In another example, the image region of mismatch includes at least one pixel.

In yet another example, detecting at least one image region of mismatch in the most recent image includes to detect an image region including:

(i) a different brightness level compared to the same region in the reference image, preferably wherein the brightness values differ by more than 10%, (ii) a registration error when being registered towards the reference image, preferably wherein the registration error is larger than 0.5 pixel with subpixel precision, and/or (iii) a mean distance error resulting from a forward-backward check of the concatenation of optical flows from the most recent image to the reference image and backwards to the most recent image, preferably wherein the mean distance is larger than 0.2 pixel.

Here, the term 'registration error' could be understand as the error in transforming different regions of the image data of the latest image into the coordinate system of the reference image.

In another example, the image processing means is adapted to process the sequence of images essentially in real-time.

Here, the term 'real-time' can be used to refer to a process that essentially runs in real-time, i.e. not taking into account the processing speed of the image processing means. For example, images might be received one by one at different time instances from the image sensor means, and the comparing, removing of detected image regions, and adding adjusted image information to a super-resolution image could then be done sufficiently fast so that a continuously updated image is shown to the driver.

Therefore, in another example, the imaging system includes image display means adapted to display the super-resolution image, preferably the image display means includes a screen, most preferably a high definition, HD, device in a CMS system.

In yet another example, the image processing means are realized on a System-on-a-Chip.

In another aspect, a rear view display device for a vehicle, preferably for a motor vehicle, includes at least part of at least one imaging system.

In yet another aspect, a method of obtaining an anti-flickering super-resolution image includes obtaining a sequence of images, comparing image information of the most recent one of the images of the sequence of images to a reference image to detect at least one image region of mismatch in the most recent image, removing the detected image region from the image information of the most recent image to obtain adjusted image information, and adding the adjusted image information of the most recent image to a super-resolution image.

The method could be a computer-implemented method, where the method could be stored as a program for operating a computing device, such as a computer and/or microprocessor.

In one example, the reference image includes at least one image of the sequence of images preceding the most recent image, preferably an image directly preceding the most recent image, and/or the super-resolution image.

In another example, detecting at least one image region of mismatch, preferably including at least one pixel, in the most recent image includes to detect an image region including:

(i) a different brightness level compared to the same region in the reference image, preferably wherein the brightness values differ by more than 10%, (ii) a registration error when being registered towards the reference image, preferably wherein the registration error is larger than 0.5 pixel with subpixel precision, and/or (iii) a mean distance error resulting from a forward-backward check of the concatenation of optical flows from the most recent image to the reference image and backwards to the most recent image, preferably wherein the mean distance is larger than 0.2 pixel.

In yet another example, the method further includes displaying the super-resolution image.

According to various aspects and example advantages, it has been advantageously found that the described system and the method address the problem of anti-flickering and also improve the overall resolution of a resulting image. In that respect reducing the data read-out from the camera and computing a super-resolved image later allows to realize the invention by means of less sophisticated, and therefore cheaper System-on-a-Chip solutions.

Also, advantageously, due to taking into account optic flow information, i.e. information in regard to the registration of objects, instead of only taking into account image information, for identifying flickering, the proposed scheme is more robust, and allows to predict the exact position of the flickering. Here, the inherent structure of an object, e.g. another vehicle, having the flickering light, e.g. headlamps, can be matched, and the errors in the optic flow in image regions that include flickering can be efficiently detected so that only image regions contribute to the super-resolution image that are essentially free of flickering.

A combination of the various measures that are described in examples of the invention to detect an image region of mismatch has been proven to produce outstanding results. Even though by comparing brightness levels alone achieves good results, determining flickering by taking into account varying brightness levels as well as registration errors achieves superior results. Advantageously, when only one camera is included in the image sensor means, and when there is no relative movement between the vehicle having the system according to the invention installed therein and the flickering object, flickering can be determined only based on the different brightness levels, however, when there is relative movement, e.g. when the vehicle is driving, flickering can be determined on image regions including different brightness levels and registration errors resulting from registering the images. However, when a camera array is included in the image sensor, flickering can be determined solely, or at least partly, based on registration errors, even when there is no relative movement between the vehicle and the flickering object, since the sequence of images includes images taken at different time instances and different observation points, due to the design of the camera array.

The imaging system can be advantageously used with cameras that are already installed on the vehicle and being used in a vehicle's ADA System. The cameras could face towards, the front, the back, the side of the vehicle, and/or towards any combination thereof. Thus, in cases where an existing ADA System is used, no new hardware must be installed in the vehicle for realizing the invention.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

FIGS. 4a, 4b, 4c, 4d, 4e, 4f, 4g, 4h, and 4i show examples of a sequence of images including flickering that can be used for obtaining an anti-flickering super-resolution image;

DETAILED DESCRIPTION

Figure 1:
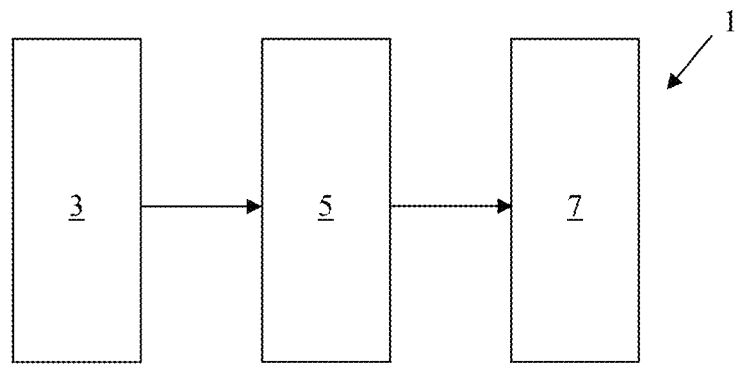
FIG. 1 shows a block diagram of an example of an imaging system.

Before explaining at least one example of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation—specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

FIG. 1 shows a block diagram of the imaging system 1 according to an example of the invention. Image sensor means 3 are shown that are adapted to obtain a sequence of images. Here, the skilled person would know that the image sensor means 3 could include a single camera, for example a digital camera, or several cameras, for example a camera array including a plurality of digital cameras.

A sequence of images obtained by the image sensor means 3 is then conveyed to, and received at a processing means 5, where the image information of the most recent one of the images of the sequence of images is compared to a reference image to detect at least one image region of mismatch in the most recent image. Thereafter, the detected image region is removed from the image information of the most recent image to obtain adjusted image information, and the adjusted image information of the most recent image is added to a super-resolution image. The skilled person knows that the above image processing could be executed continuously so that the super-resolution image is continuously updated with new image information. Also, at the same rate the super-resolution image is updated with new image information, old image information, e.g. information from images that were recorded a while back, for example ten to twenty frames, e.g. images, ago is removed again from the super-resolution image so that the super-resolution image only contains rather current information.

Also shown in FIG. 1 are image display means 7 adapted to display the super-resolution image. The skilled person would know that the image display means 7 could, for example, include a display arranged in the centre console of the vehicle.

Figure 2:
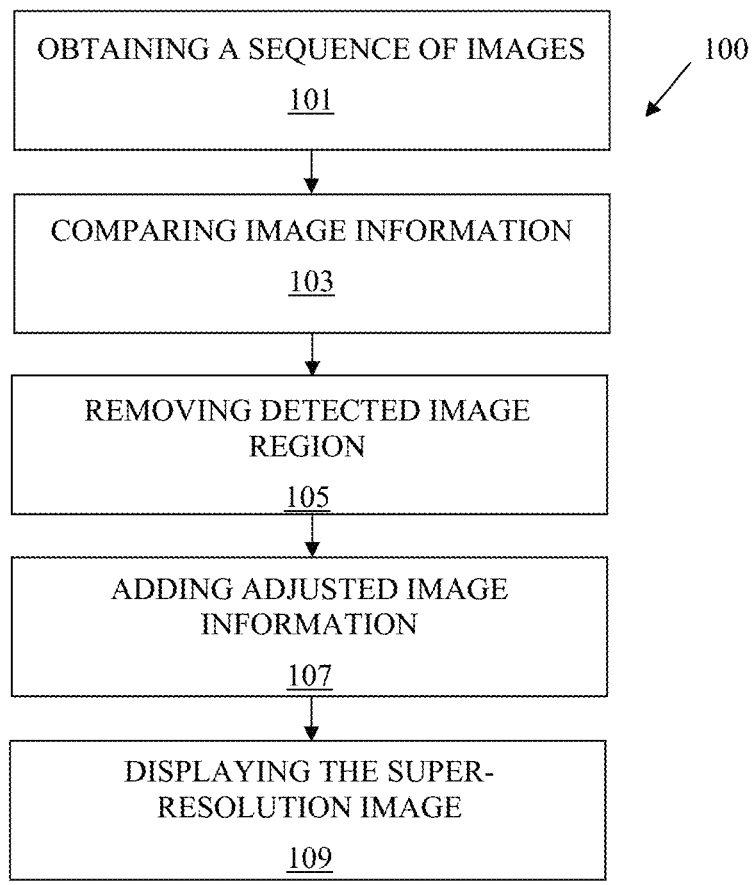
FIG. 2 shows a functional diagram of an example of a method of obtaining an anti-flickering super-resolution image.

FIG. 2 shows a functional diagram of a method 100 of obtaining an anti-flickering super-resolution image according to an example of the invention.

The method 100 of obtaining an anti-flickering super-resolution image, includes the steps of obtaining 101 a sequence of images; comparing image information 103 of the most recent one of the images of the sequence of images to a reference image to detect at least one image region of mismatch in the most recent image; removing 105 the detected image region from the image information of the most recent image to obtain adjusted image information; and adding 107 the adjusted image information of the most recent image to a super-resolution image.

The method 100 can further include the step of displaying 109 the super-resolution image. However, the skilled person would know that the super-resolution image could be also transmitted to another computing device located in the vehicle for further processing.

Figure 3A:
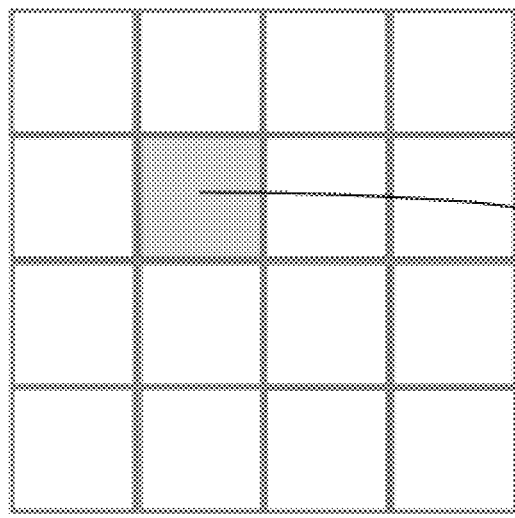
FIGS. 3a, 3b, 3c, and 3d show an example of schematic pixel grids of a most recent image and a reference image used for the forward-backward check.
Figure 3B:
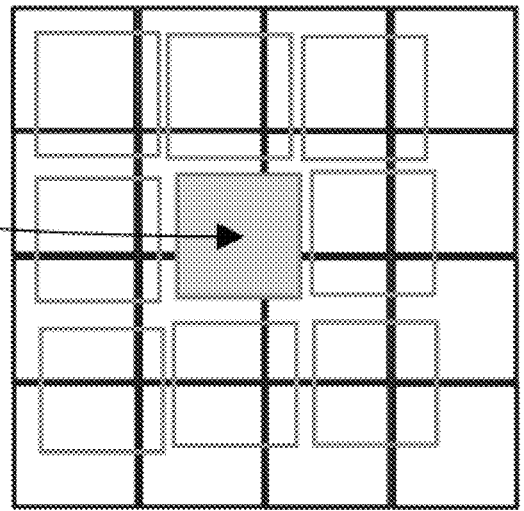

FIGS. 3*a* to 3*d* show schematic pixel grids of a most recent image and a reference image used for the forward-backward check. FIG. 3*a* is an example of a schematic pixel grid of the most recent image that could be input to the method that is described above in regard to FIG. 2. Here, one random pixel of interest, which is shaded grey, is chosen for the forward-backward check. The skilled person would know that any pixel in the image as well as a group of pixels could be used for the forward-backward check. FIG. 3*b* shows the pixel grid of the reference image and an arrow is used to show the forward matching of the pixel of interest to the pixel grid of the reference image.

Figure 3C:
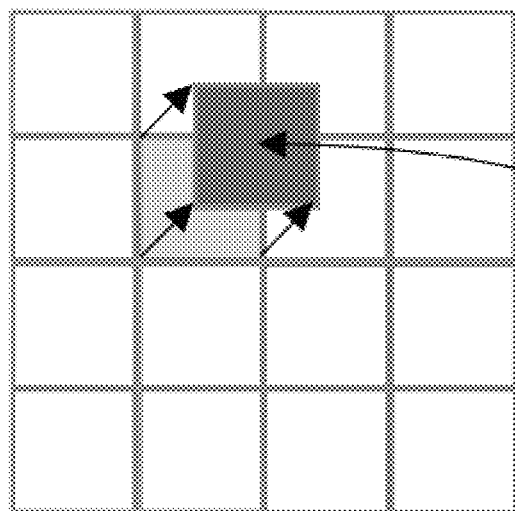
Figure 3D:
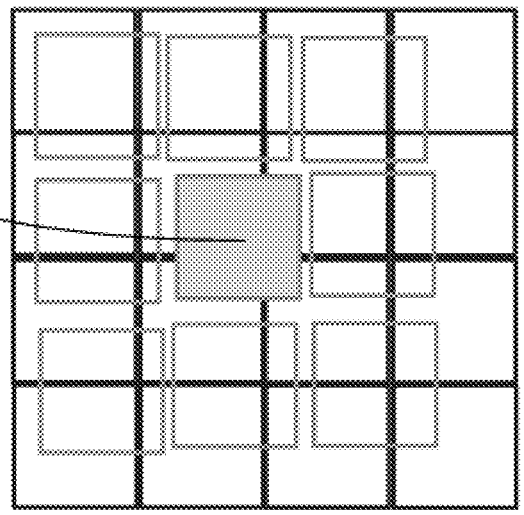

As shown in the example of FIG. 3*b*, the pixel of interest is slightly offset in regard to the reference pixel in the pixel grid of the reference image, indicating an error in the concatenation of optical flows. FIG. 3*d* essentially corresponds to FIG. 3*c* and the arrow pointing from FIG. 3*d* to FIG. 3*c* shows the backtracking to the original pixel grid with backward matching. The arrows that indicate the offset between the two grey-shaded pixels also indicate a local forward-backward matching error that can be used to detect an image region of mismatch in the most recent image. A mean distance error larger than 0.2 pixels was empirically determined to provide high quality results.

Figure 5A:
FIG. 5a shows an example of an interpolated image resulting from the sequence of images of FIGS. 4a to 4i.

FIGS. 4*a* to 4*i* show examples of a sequence of images of a LED display including flickering that can be used for obtaining an anti-flickering super-resolution image. In FIG. 5*a* an interpolated image resulting from the sequence of images of FIGS. 4*a* to 4*i* is shown. From FIG. 5*a* it can be seen that the flickering effects remain if the images of the sequence of images are merely interpolated.

Figure 5B:
FIG. 5b shows an example of an anti-flickering super-resolution image resulting from the sequence of images of FIGS. 4a to 4i.

In FIG. 5*b* an anti-flickering super-resolution image resulting from the sequence of images of FIGS. 4*a* to 4*i* is shown. The shown anti-flickering image could results from the image system according to the invention, and/or from the respective method according to the invention. As it can be seen from FIG. 5*b* by removing image information of mismatch from the images contributing to the super-resolution image, adverse effects that are due to flickering can be nearly completely avoided.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent presently preferred embodiments of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

REFERENCE SIGNS

1 imaging system
3 image sensor means
5 processing means
7 displaying means
100 Method of obtaining an anti-flickering super-resolution image
101 Obtaining
103 Comparing
105 Removing
107 Adding
109 Displaying

What is claimed is:

1. An imaging system for a vehicle for obtaining an anti-flickering super-resolution image, comprising:
    an image sensor adapted to obtain a sequence of images; and
    an image processor adapted to receive the sequence of images, compare image information of a most recent image of the sequence of images to a reference image to detect at least one image region of mismatch in the most recent image, remove the detected image region from image information of the most recent image to obtain adjusted image information, and add the adjusted image information of the most recent image to a super-resolution image; and
    a plurality of cameras,
    wherein the super-resolution image, to which the adjusted image information is added, is an enhanced image where the entire image information or part of the image information of at least two images is used to create an optically enhanced image such that the optically enhanced image results in a reduction of flickering,
    wherein each of the plurality of cameras is adapted to obtain at least one image, and wherein the plurality of cameras are adapted to obtain images at different time instances, wherein each camera of the plurality of cameras is adapted to operate at a rate of 14 to 600 frames per second, and is adapted to obtain images at an interval of 16 or 33 ms.

2. The imaging system of claim 1, wherein the reference image comprises at least one of:
    at least one image of the sequence of images preceding the most recent image; and
    the super-resolution image.

3. The imaging system of claim 1, wherein the image sensor comprising at least one camera of a vehicle's Advanced Driver Assistance System (ADAS) or Content Management System (CMS).

4. The imaging system of claim 1, wherein the image sensor comprises at least one of:
    at least one camera array comprising a plurality of cameras that are positioned apart from each other at a distance in the region of 1 cm to 2 cm; and
    a stereo camera.

5. The imaging system of claim 1, wherein the image region of mismatch comprises at least one pixel.

6. The imaging system of claim 1, wherein detecting at least one image region of mismatch in the most recent image comprises detecting an image region comprising at least one of:
    a different brightness level compared to a same region in the reference image wherein a brightness values differ by more than 10%;
    a registration error when being registered towards the reference image wherein the registration error is larger than 0.5 pixel with subpixel precision; and
    a mean distance error resulting from a forward-backward check of a concatenation of optical flows from a most recent image to the reference image and backwards to the most recent image, wherein the mean distance is larger than 0.2 pixel.

7. The imaging system of claim 1, wherein the image processor is adapted to process the sequence of images in real-time.

8. The imaging system of claim 1, further comprising an image display adapted to display the super-resolution image, the image display comprising a screen.

9. The imaging system of claim 1, wherein the image processor is realized on a System-on-a-Chip.

10. A rear view display device for a vehicle comprising at least part of at least one imaging system of claim 1.

11. A method of obtaining an anti-flickering super-resolution image, comprising:
obtaining a sequence of images using a plurality of cameras;
comparing image information of a most recent image of the sequence of images to a reference image to detect at least one image region of mismatch in the most recent image;
removing the detected image region from image information of the most recent image to obtain adjusted image information; and
adding the adjusted image information of the most recent image to a super-resolution image,
wherein the super-resolution image, to which the adjusted image information is added, is an enhanced image where the entire image information or part of the image information of at least two images is used to create an optically enhanced image such that the optically enhanced image results in a reduction of flickering, and
wherein the plurality of cameras are adapted to obtain images at different time instances, wherein each camera of the plurality of cameras is adapted to operate at a rate of 14 to 600 frames per second, and is adapted to obtain images at an interval of 16 or 33 ms.

12. The method of claim 11, wherein the reference image comprises at least one of:
at least one image of the sequence of images preceding the most recent image; and
the super-resolution image.

13. The method of claim 11, wherein detecting at least one image region of mismatch in the most recent image comprises detecting an image region comprising at least one of:
a different brightness level compared to a same region in the reference image wherein a brightness values differ by more than 10%;
a registration error when being registered towards the reference image wherein the registration error is larger than 0.5 pixel with subpixel precision; and
a mean distance error resulting from a forward-backward check of a concatenation of optical flows from a most recent image to the reference image and backwards to the most recent image, wherein the mean distance is larger than 0.2 pixel.

14. The method of claim 11, further comprising displaying the super-resolution image.

15. An imaging system for a vehicle for obtaining an anti-flickering super-resolution image, comprising:
an image sensor adapted to obtain a sequence of images; and
an image processor adapted to receive the sequence of images, compare image information of a most recent image of the sequence of images to a reference image to detect at least one image region of mismatch in the most recent image, remove the detected image region from image information of the most recent image to obtain adjusted image information, and add the adjusted image information of the most recent image to a super-resolution image,
wherein the image sensor comprises at least one of:
at least one camera array comprising a plurality of cameras that are positioned apart from each other at a distance in the region of 1 cm to 2 cm; and
a stereo camera, and
wherein each of the plurality of cameras is adapted to obtain at least one image, and wherein the plurality of cameras are adapted to obtain images at different time instances, wherein each camera of the plurality of cameras is adapted to operate at a rate of 14 to 600 frames per second, and is adapted to obtain images at an interval of 16 or 33 ms.

16. A method of obtaining an anti-flickering super-resolution image, comprising:
obtaining a sequence of images using an image sensor;
receiving and comparing, using an image processor, image information of a most recent image of the sequence of images to a reference image to detect at least one image region of mismatch in the most recent image;
removing, using the image processor, the detected image region from image information of the most recent image to obtain adjusted image information; and
adding, using the image processor, the adjusted image information of the most recent image to a super-resolution image,
wherein the image sensor comprises at least one of:
at least one camera array comprising a plurality of cameras that are positioned apart from each other at a distance in the region of 1 cm to 2 cm; and
a stereo camera, and
wherein each of the plurality of cameras is adapted to obtain at least one image, and wherein the plurality of cameras are adapted to obtain images at different time instances, wherein each camera of the plurality of cameras is adapted to operate at a rate of 14 to 600 frames per second, and is adapted to obtain images at an interval of 16 or 33 ms.

* * * * *